Jan. 1, 1929. 1,697,106
F. J. CARMAN ET AL
MANUFACTURE OF FORMALDEHYDE AND OTHER OXIDATION
PRODUCTS OF HYDROCARBONS
Filed May 10, 1924
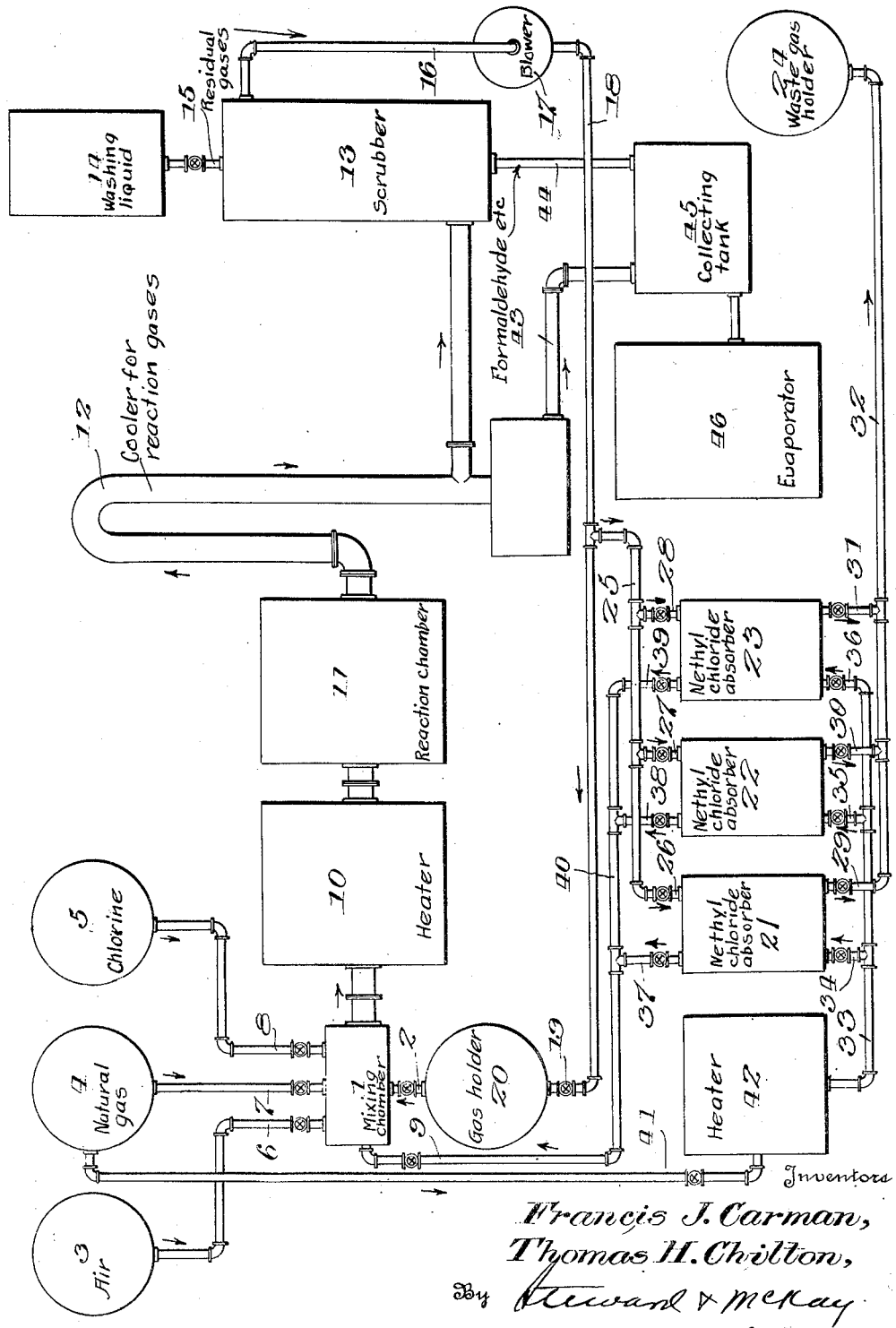
Inventors
Francis J. Carman,
Thomas H. Chilton,
By Stewart & McKay
Their Attorneys Patented Jan. 1, 1929.

1,697,106

UNITED STATES PATENT OFFICE.

FRANCIS J. CARMAN AND THOMAS H. CHILTON, OF NEW YORK, N. Y.

MANUFACTURE OF FORMALDEHYDE AND OTHER OXIDATION PRODUCTS OF HYDR - CARBONS.

Application filed May 10, 1924. Serial No. 712,385.

This invention relates to manufacture of formaldehyde and other oxidation products of hydrocarbons; and it relates more particularly to processes in which hydrocarbons are halogenated and halogen derivatives oxidized, most advantageously with the aid of suitable catalysts or promoting agents, under conditions favoring production of the desired oxidation products from the hydrocarbons. More specifically the invention relates to the manufacture of aldehydes, and particularly formaldehyde, by a procedure of this general description.

In the prior co-pending application of Francis J. Carman, Serial No. 656,085, filed August 6, 1923, a method of the above general character for effecting limited oxidation of hydrocarbons, particularly applicable to the manufacture of formaldehyde, is disclosed and broadly claimed. Briefly described, the method of said prior application, as applied to the manufacture of formaldehyde, consists in commingling an excess of methane in the form of natural gas with available chlorine and oxygen, and passing the resultant mixture through a mass of appropriate contact material, particularly barium chlorid, contained in a reaction chamber that is maintained at temperatures favorable to the formation of formaldehyde and specifically within the approximate range of 400° to 500° C., the effluent gas mixture being suitably treated for removal of formaldehyde. The residual gas mixture containing principally methane, methyl chlorid and oxygen may be passed again through the reaction or converting zone after such additions of chlorine, oxygen and natural gas as are necessary to approximate the desired proportioning of the essential ingredients of the gas mixture, this cyclical method of operation being especially advantageous.

In principle, the process comprises a carefully controlled and regulated oxidation of hydrocarbons, in the course of which oxidation hydrocarbons pass through, or may be considered to pass through a transition stage in which they exist temporarily in halogenated form as the result of what may be termed an initial oxidation. Further oxidation results in splitting off the corresponding hydrogen halid and producing the desired intermediate oxidation product of the particular hydrocarbon in question; while oxidation of the hydrogen halid regenerates the halogen which is used to halogenate more of the hydrocarbon and thus maintain a cyclical process. In applying the process for the manufacture of formaldehyde from methane, using chlorine as the halogenating agent, the following reactions may represent, for purposes of explanation, what occurs:

$$2CH_4 + 2Cl_2 \rightarrow 2CH_3Cl + 2HCl \quad (1)$$
$$2CH_3Cl + O_2 \rightarrow 2CH_2O + 2HCl \quad (2)$$
$$4HCl + O_2 \rightarrow 2H_2O + 2Cl_2 \quad (3)$$

It is not to be inferred, however, that the reactions actually involved necessarily correspond precisely to those above given. In practice there are also side-reactions, such as further chlorination to polychlor-derivatives, and oxidation of these and of formaldehyde and other oxygen derivatives to carbon monoxid, carbon dioxid and water.

As indicated in said prior application, while the process has particularly great present utility in the manufacture of formaldehyde, it is applicable also to limited oxidation not only of aliphatic or paraffin hydrocarbons but also of aromatic hydrocarbons, especially those containing paraffin side-chains, as for example, in oxidizing toluene to benzaldehyde.

The present improvements, which will be pointed out hereinafter, are the result of further experience in practical development of the process disclosed in the prior application aforesaid and involve certain important discoveries by which the effectiveness, economy and general commercial feasibility of said process are materially enhanced.

Whereas it has been considered impractical heretofore to employ reaction temperatures above 500° C. in this process, it has now been found that by proper correlation of the reaction temperature and the speed at which the gas mixture is passed through the reacting zone, it is not only feasible but highly desirable to employ temperatures ranging from 500° C. upwards to a point just short of that at which the gaseous mixture will ignite or inflame under the conditions obtaining in the reaction zone. As a rule, the point of inflammation seems to be in the neighborhood of 650° C., so that ordinarily the reaction temperature should be maintained sufficiently below 650° C. to avoid the danger of the mixture inflaming. In employing reacting temperatures in excess of 500° C. the space velocity of the gaseous mixture should not be less than 200. On the other hand, it is seldom feasible practically to employ space velocities greatly exceeding 5,000. The expression "space velocity" as here used, signifies the number of volumes of gas mixture, measured under standard conditions (e. g. at 20° C. and 760 mms. pressure) passing through each volume of space in the reaction zone or chamber per hour; or, where the reaction zone is filled with a catalyst, which is to be recommended in practice, it means the number of volumes of gas mixture passing per hour through each volume of space devoted to the catalyst. It has been found that, in manufacturing formaldehyde in accordance with the present improved process, the employment of reaction temperatures between 550° and 575° C., in conjunction with space velocities of between 1500 and 2500, is especially effective and results in maximum yields in a given time. In a specific embodiment of the invention, with barium chlorid as the catalytic or promoting agent, a reaction temperature of about 565° C. and a space velocity of about 2050 have given particularly good results, the reacting constituents of the gas mixture in this instance comprising one part methyl chlorid, one part oxygen, and four parts methane, all parts by volume. Under these conditions the conversion of methyl chlorid into formaldehyde in a single passage of the mixture through the reaction chamber was 8 per cent in a typical instance giving a yield of about 50 per cent of theoretical, based on the total consumption of the hydrocarbon (methane) in the reaction, this being satisfactory commercial operation. If the conversion percentage be pushed too high, the yield is cut down rapidly.

Considering the manufacture of formaldehyde specifically, the properties of formaldehyde which limit practically the concentration in which it may be produced from the gas mixture of the novel process favor the adoption of a cyclical procedure in commercial operation. Similar considerations govern in applying the process to the manufacture of other oxidation products of hydrocarbons. During the early stages of the development of said process, it was deemed necessary from a commercial standpoint to use oxygen gas as such in making up the gas mixtures, and to remove all products of oxidation so that the active mixture would never become diluted; for if air were used, additions thereof to the gas stream in circuit to make up for the oxygen consumed in the reaction, would carry in four times as much nitrogen by volume, and the active mixture would become more and more dilute after each passage through the process, the dilution becoming excessive in a comparatively short time. If, after removal of the formaldehyde, the residual gases carried nothing but natural gas and air, a certain portion could be removed after each passage to keep the volume constant without great expense, because such portion could be utilized for its fuel value. However, in the case of formaldehyde manufacture, the gas stream contains in addition a substantial percentage of methyl chlorid, the production of formaldehyde in this process being approximately proportionate to the amount of this substance present in the gas stream, other things being equal, and the methyl chlorid is therefore valuable for its chlorine and could not profitably be wasted. Therefore in said prior application, the use of oxygen gas as such was recommended and emphasized.

A way has now been found whereby this methyl chlorid (or, more generally, halogen-hydrocarbon) content of the gas stream can be removed or temporarily withdrawn from the gas stream, leaving natural gas and oxygen or air as the principal residual constituents. It is therefore economically feasible to vent or to divert from the gas-circuit such portion of this residual gas mixture as is necessary to effect the desired reduction of volume; after which the temporarily withdrawn methyl chlorid can be returned to the reduced volume of gas mixture still remaining in the circuit. Also, such further additions of chlorine and oxygen can then be made as are necessary to restore or approximate the initial or desired proportioning of the essential reacting constituents, prior to again introducing the gas mixture into the reaction chamber. It thus becomes practicable to employ air as the source of oxygen, either alone or in mixture with added oxygen gas. The temporary removal or withdrawal of the halogen-hydrocarbon, methyl chlorid in the specific example, is most conveniently effected by absorbing the same in activated charcoal, or other specific adsorbent. It has been found that a commercially available activated charcoal of good grade, will absorb up to 20 per cent of its weight of methyl chlorid at room temperature, and that the methyl chlorid will be readily given up again by said charcoal at around 100° C. The cost of the absorbing and releasing operations is small, consisting mainly of the cost of blowing the gases through the bed of activated charcoal. The proportion of gases diverted from the main gas stream in circuit and passed through the methyl chlorid absorber necessarily depends on the particular concentration of active mixture which is predetermined to be that most desirable to maintain under the general conditions of operation. That portion of the gases thus diverted through the methyl chlorid absorber, being free from methyl chlorid, but containing large percentages of natural gas, can be used for fuel in other parts of the process and its value thus conserved.

Another important feature of the present improvements is the employment of the catalyst or promoting agent in a better form than has been available heretofore. In this improved form, the catalysts which have proved most efficient in the process can be prepared in granular yet porous structure which will not offer too much resistance to the flow of gases and yet will offer a large active surface for contact with the gas. It is of course generally recognized that it is desirable to employ catalysts of such physical characteristics; but prior to the present invention no altogether satisfactory method of preparing in this form alkaline earth metal compounds, such as barium chlorid, strontium chlorid, and calcium chlorid, which are especially well adapted for the present process, has been available. This phase of the present improvements will be gone into more fully after a more detailed description has been given of the before-mentioned improvements in the main process.

The principles underlying the limited oxidation of hydrocarbons in accordance with the improved procedure of the present invention will be better understood by describing a concrete typical embodiment of the invention as applied to the manufacture of formaldehyde, although the broad applicability of the invention to limited oxidation of hydrocarbons generally that are available in gaseous or vaporous form, is to be understood as contemplated herein. A suitable arrangement of apparatus is shown in the accompanying drawing which is to be understood as largely diagrammatic in character. The legends appearing on the drawing are supplied in compliance with official requirement to facilitate an understanding of the specific illustrative embodiment of the invention now to be described. Said legends are not to be understood as in any sense restrictive. In one way of practicing the invention, residual gases from previous passages of gas mixtures through the apparatus circuit are introduced into a suitable mixing chamber 1 through valved pipe 2; and from holders 3, 4 and 5, air, natural gas and chlorine, respectively, are introduced into said chamber through valved pipes 6, 7 and 8, in such quantities as may be necessary to maintain a predetermined desired proportioning and concentration of the essential reacting ingredients in the mixture to be passed into the reaction zone, such essential ingredients being, in this instance, methane, chlorine and oxygen, in available form. Any desired portion of the natural gas used may have been charged with methyl chlorid in a manner that will be explained later, such portion entering the mixing chamber by way of valved pipe 9. The gases thus mixed in proper porportions next pass to a pre-heating furnace 10, provided with suitable heating means (not shown), where they are brought to the proper temperature for reaction. The heated gases then pass into reaction chamber 11, provided with temperature-controlling means (not shown). Here the mixture is brought into contact with suitable catalytic material under regulated conditions, formaldehyde being produced. In practice the reaction chamber 11 is practically filled with granular catalytic material, consisting most desirably of one or more alkaline earth metal compounds, so that the gases are compelled to travel through the granular mass. The effluent gases are then cooled in cooling pipe 12 and, passing thence into the scrubbing tower 13 of acid-proof construction, are washed with water supplied from tank 14 through valved pipe 15 for recovery of the formaldehyde and absorption of the hydrochloric acid formed as a result of the reaction. The cooling pipe 12 and scrubbing tower 13 may be of types in common use for hydrochloric acid absorption, or of any other suitable design. From the scrubbing tower 13, the gases are drawn through pipe 16 by blower 17 and are sent by way of pipe 18, valved at 19, to a holder 20. A portion of said gases, however, is by-passed, intermittently or continuously, through one or another of the charcoal absorbers 21, 22 and 23, the methyl chlorid of such by-passed portion being absorbed by the activated charcoal while the unabsorbed gases go to the waste gas holder 24. For this purpose, there is provided the by-pass header 25 branching from pipe 18 between pump 17 and valve 19, individual valved inflow pipes 26, 27, 28 leading from said manifold into the respective absorbers; while valved outflow pipes 29, 30 and 31, lead from the absorbers to header 32 and thence to waste gas holder 24. To permit passing gas through said holders in the reverse direction, there is an inlet header 33, from which valved inflow pipes 34, 35, 36 lead into the respective absorbers; while co-operating valved outflow pipes 37, 38, 39, lead into header 40 to which the aforesaid pipe 9 connects. Three absorbers are provided, as shown, in order that while one is absorbing methyl chlorid, another may be giving up methyl chlorid to heated methane or natural gas, and the third may be cooling. Thus, assume that gases by-passed from blower 17 are passing through the absorber 21, that absorber 22 is cooling down, and that previously absorbed methyl chlorid is being released from absorber 23. Under these conditions, the valves in pipes 26, 29 and 36, 39 are open, while those in all the other pipes directly entering or leaving the absorbers are closed. That portion of the gas mixture being vented from the system is now by-passed through absorber 21, which takes out the methyl chlorid and allows the remainder to go to holder 24. At the same time, natural gas supplied through pipe 41 from holder 4, after first being heated in suitable heater 42 to 100° C. or slightly warmer, passes thence by way of header 33 and reverse inflow pipe 36 into and through absorber 23 where it releases and carries off with it to the mixing chamber 1, by way of 39, 40 and 9, the methyl chlorid previously absorbed by the activated charcoal in that absorber by gases by-passed from blower 17.

The solutions of formaldehyde and hydrochloric acid obtained in the cooler and scrubber 12 and 13 may be discharged through pipes 43, 44, and collected in tank 45 and there neutralized by any suitable alkaline medium, most conveniently by the caustic soda produced in conjunction with the chlorine used in the process; the neutralized solution being then transferred to an evaporator 46 and evaporated for recovery of the formaldehyde content.

The proportions of the reacting gases employed in the mixture passed through the reaction chamber may be varied to suit different conditions of operation, and the concentration may be controlled by varying the amount vented through the methyl chlorid absorbers. A mixture which has been found to work well in practice contains four parts methane, one part methyl chlorid, one part oxygen, and six parts nitrogen; all parts being by volume. It will be seen that this or any other desired proportioning of the essential ingredients of the gaseous (i. e. gaseous or vaporous) reaction mixture can be attained in mixing chamber 1 into which may be introduced circuit gases direct from holder 20, natural gas charged with methyl chlorid from one of the methyl chlorid absorbers, together with air, and with natural gas and chlorine drawn direct from the natural gas holder and the chlorine holder, as shown. It is, of course, not to be inferred that nitrogen is an essential ingredient of the gaseous mixture in the sense that it takes part in the reaction. It is, however, the principal diluent to be reckoned with when air is employed as the source of available oxygen, and the ability to control its proportion is important.

It has been found that in the manufacture of formaldehyde in accordance with the invention, the yield may be substantially increased if the gaseous mixture supplied to the reaction zone contains one or more of the higher homologues of methane and the corresponding halid or halids. For instance, when mixtures containing ethane in addition to methane, and ethyl chlorid in addition to methyl chlorid, are passed through the reaction zone, the concentration of formaldehyde in the resultant reaction gases is found to be materially greater than when ethane and ethyl chlorid are not employed. This increase is so considerable as to render a single-passage treatment, as distinguished from a cyclical treatment, commercially feasible or advisable in some cases. The resultant formaldehyde contains acetaldehyde, but in commercial formaldehyde this is often unobjectionable. The increased yield is nevertheless largely formaldehyde, due apparently to oxidation of a large part of the initially formed acetaldehyde to carbon monoxid, water, and formaldehyde under the conditions of the process.

As illustrating the feasibility of using halogenating agents other than methyl chlorid, it may be noted that good results are obtained in carrying out the process using either chloroform, or carbon tetrachlorid, or both, in the gaseous mixture passed in contact with the catalyst. Chlorine compounds are ordinarily the most convenient halogenating agents to employ, but the use of bromine or other halogen compounds, or such other halogens per se, is not to be understood as excluded.

Referring now more particularly to the present improvements in the catalyst itself, it may be stated that the catalysts at first considered best for promoting the oxidation of methyl chlorid to formaldehyde were preparations of barium chlorid in powdered form, it having been demonstrated that fine subdivision of the barium chlorid is essential to high activity of the catalytic material. Catalytic material in the form of fine powder, does not, however, offer a large active surface under conditions of actual use because the gases cannot well be passed through it and must therefore be passed over it. Merely compressing the fine powder sufficiently to cause it to cohere into granules usually greatly reduces the catalytic activity of the material. It has been found, however, that by proceeding in the manner now to be explained, it is possible to cement or bind the fine particles of barium chlorid crystals together lightly to a sufficient extent to enable the resultant granules or lumps to stand crushing down to a uniform size, and also to support their own weight when charged into catalytic apparatus, while at the same time obtaining granules that are porous in structure and through which gases diffuse readily. This result is accomplished by the employment, in conjunction with barium chlorid, for example, of a binder substance not so foreign thereto as to affect unfavorably the reaction to be promoted.

The method of forming granular catalytic material of the character in question is based on the fact that the hexahydrates of strontium and calcium chlorids will melt in their water of crystallization, while the dihydrate of barium chlorid will not. In carrying out this phase of the invention in a typical successful embodiment, barium chlorid dihydrate ($BaCl_2.2H_2O$) is mixed with a suitable proportion of strontium chlorid hexahydrate ($SrCl_2.6H_2O$), and the mixture is heated to practically complete dehydration, a temperature of around 150° C. being suitable. Calcuim chlorid hexahydrate may be employed instead of the strontium compound, although calcium chlorid hexahydrate is less convenient because its melting point is so low (30° C.). An addition of the strontium compound amounting to from 10 to 20 per cent of the weight of the barium salt suffices to give a satisfactory mixture. After the described dehydration, the dry mixture is next ground fine and sifted to remove oversize particles. Grinding until the powder will practically all pass a 200-mesh sieve is good practice. The fine powder is then exposed to water vapor in such concentration that the salts of the mixture will become completely rehydrated to barium dihydrate and strontium hexahydrate, respectively, but will not pass into solution. This may be attained by circulating over the powder air which has been brought into contact with a saturated solution of the salts in question. During this operation the powder must be kept below the melting point of the hexahydrate, a temperature of 50° C. being satisfactory. When completely hydrated, the powder is brought just to the melting point of said hexahydrate (say 115° to 120° C.) in a closed container so that no loss of water may occur. The mass becomes plastic and can be molded if desired. It sets again on cooling below said temperature. The lumps or blocks so formed upon setting are now dehydrated in a current of dry air below the melting point and, when crushed to suitable size, make an active catalyst in the form of firm and comparatively strong granules which are nevertheless of a suitably porous structure. It will be seen that, generally stated, this method of preparation consists of cementing with a chemically allied substance a higher hydrate of another alkaline earth chlorid. Tablets or the like formed by merely compressing a finely powdered mixture of barium chlorid dihydrate and strontium chlorid hexahydrate, and drying, without following the more elaborate procedure just described, show good catalytic activity, although not to so marked a degree.

What is claimed is:

1. In the manufacture of formaldehyde, the process which comprises subjecting a gaseous mixture comprising methane, a halogenating agent and oxygen to heat at a temperature above 500° C. but insufficiently high to cause the mixture to inflame, and recovering resultant formaldehyde.

2. In the manufacture of formaldehyde, the process which comprises subjecting a gaseous mixture comprising methane, a halogenating agent and oxygen to heat at a temperature above 500° C. but insufficiently high to cause the mixture to inflame, in the presence of a promoting agent, and recovering resultant formaldehyde.

3. In the manufacture of formaldehyde, the process which comprises passing a gaseous stream comprising methane, a hologenating agent and oxygen, through a reaction zone containing a catalytic agent and maintained at reacting temperature, the space-velocity of said stream being above 200, and recovering formaldehyde from the effluent stream.

4. In the manufacture of formaldehyde, the process which comprises passing a gaseous stream comprising methane, a halogenating agent and oxygen, through a reaction zone containing a catalytic agent and maintained at reacting temperature, between 500° and 560° C., the space-velocity of said stream being between 500 and 5000, and recovering formaldehyde from the effluent stream.

5. In the manufacture of formaldehyde, the process which comprises passing a gaseous stream comprising methane, a halogenating agent and oxygen, through a reaction zone containing a catalytic agent and maintained at reacting temperature of between 550° and 575° C. the space-velocity of said stream being between 1500 and 2500, and recovering formaldehyde from the effluent stream.

6. In the manufacture of oxidation products of hydrocarbons, the cyclical process which comprises passing a continuous stream of a gaseous mixture comprising as essential constituents a hydrocarbon, available oxygen and available halogen, accompanied by a diluting gas, through a reaction chamber at reacting temperature favorable to limited oxidation of the hydrocarbon, separating a desired oxidation product from the effluent mixture, thereafter diverting a portion of the gaseous stream and removing a halogen derivative of said hydrocarbon from such portion, adjusting the composition of the remainder of said gaseous stream, partly at least by restoring thereto the halogen derivative so removed, to approximate the original proportioning of essential constituents, and repeating the foregoing steps cyclically.

7. The process set forth in claim 6 further characterized by employment in the reaction chamber of a catalyst favoring oxidation under the conditions of operation.

8. In the manufacture of oxidation products of hydrocarbons, the cyclical process which comprises passing a continuous stream of a gaseous mixture comprising a hydrocarbon, available chlorine, oxygen and nitrogen, through a reaction chamber at a reacting temperature favorable to limited oxidation of the hydrocarbon, separating a desired oxidation product from the effluent mixture, thereafter diverting a portion of the gaseous stream and removing a chlorine derivative of said hydrocarbon from such portion by means of an adsorbent agent, adjusting the composition of the remainder of said gaseous stream, partly at least by restoring thereto the halogen derivative so removed, to approximate the original proportioning of essential constituents, and repeating the foregoing steps cyclically.

9. In the manufacture of formaldehyde, the process which comprises passing through a suitably heated reaction chamber containing catalytic material a gaseous stream comprising methane, methyl chlorid, oxygen and nitrogen, separating formaldehyde from the effluent gaseous stream, reducing the volume of said stream by venting a portion thereof through an adsorbent for methyl chlorid, restoring the normal volume of said stream by liberating methyl chlorid from said adsorbent and by additions of methane and air, and passing the restored gaseous stream through said reaction chamber in cyclical repetition of the stated procedure.

10. The process defined in claim 9, further characterized by the fact that the adsorbent employed is activated charcoal, through which the vented portion of the gaseous stream is passed at ordinary temperature for absorption of methyl chlorid, and from which the methyl chlorid is subsequently liberated by passing therethrough at higher temperature a gas used in restoring said stream to normal.

11. In the manufacture of oxidation products of hydrocarbons, the process which comprises subjecting a mixture of hydrocarbons to the action of available oxygen under reacting conditions in the presence of a halogenating agent to facilitate the desired oxidation, and recovering a desired oxidation product.

12. In the manufacture of oxidation products of hydrocarbons, the process which comprises halogenating a mixture of hydrocarbons in heated gaseous condition in the presence of available oxygen and of a catalyst aiding oxidation of hydrogen halid, and separating a desired oxidation product from the reaction gases.

13. In the manufacture of formaldehyde, the process which comprises subjecting a gaseous mixture comprising methane, a higher homologue thereof, a halogenating agent and available oxygen to heat at a reacting temperature in the presence of a promoting agent, and recovering a resultant product containing formaldehyde.

14. In the manufacture of formaldehyde, the process which comprises subjecting a gaseous mixture comprising methane, ethane, a halogenating agent and available oxygen to heat at a reacting temperature in the presence of a promoting agent, and recovering a resultant product consisting largely of formaldehyde.

In testimony whereof we hereunto affix our signatures.

FRANCIS J. CARMAN.
THOMAS H. CHILTON.